Aug. 26, 1969    R. F. JONES ETAL    3,463,051
POSITION CONTROL EQUIPMENT

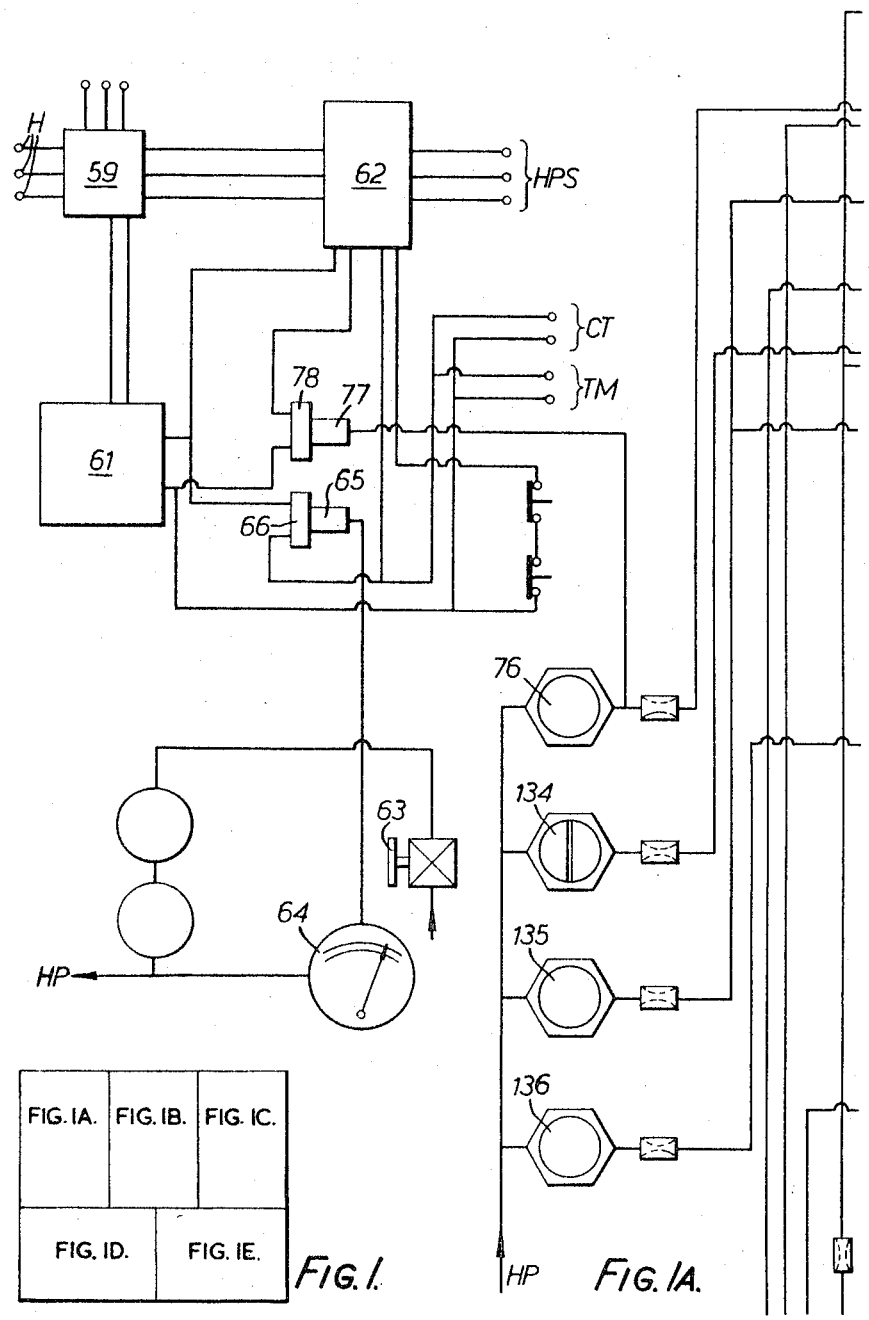

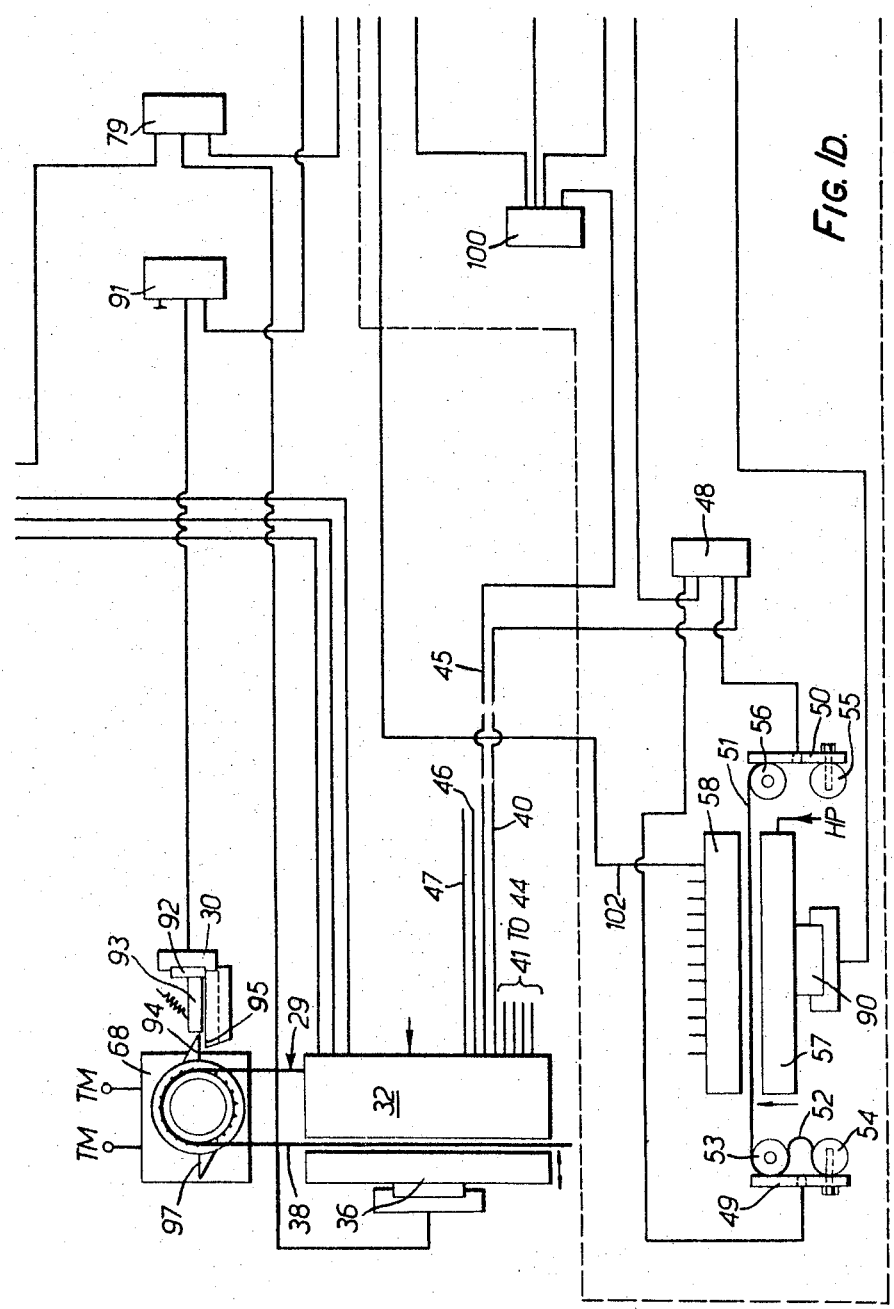
FIG. ID.

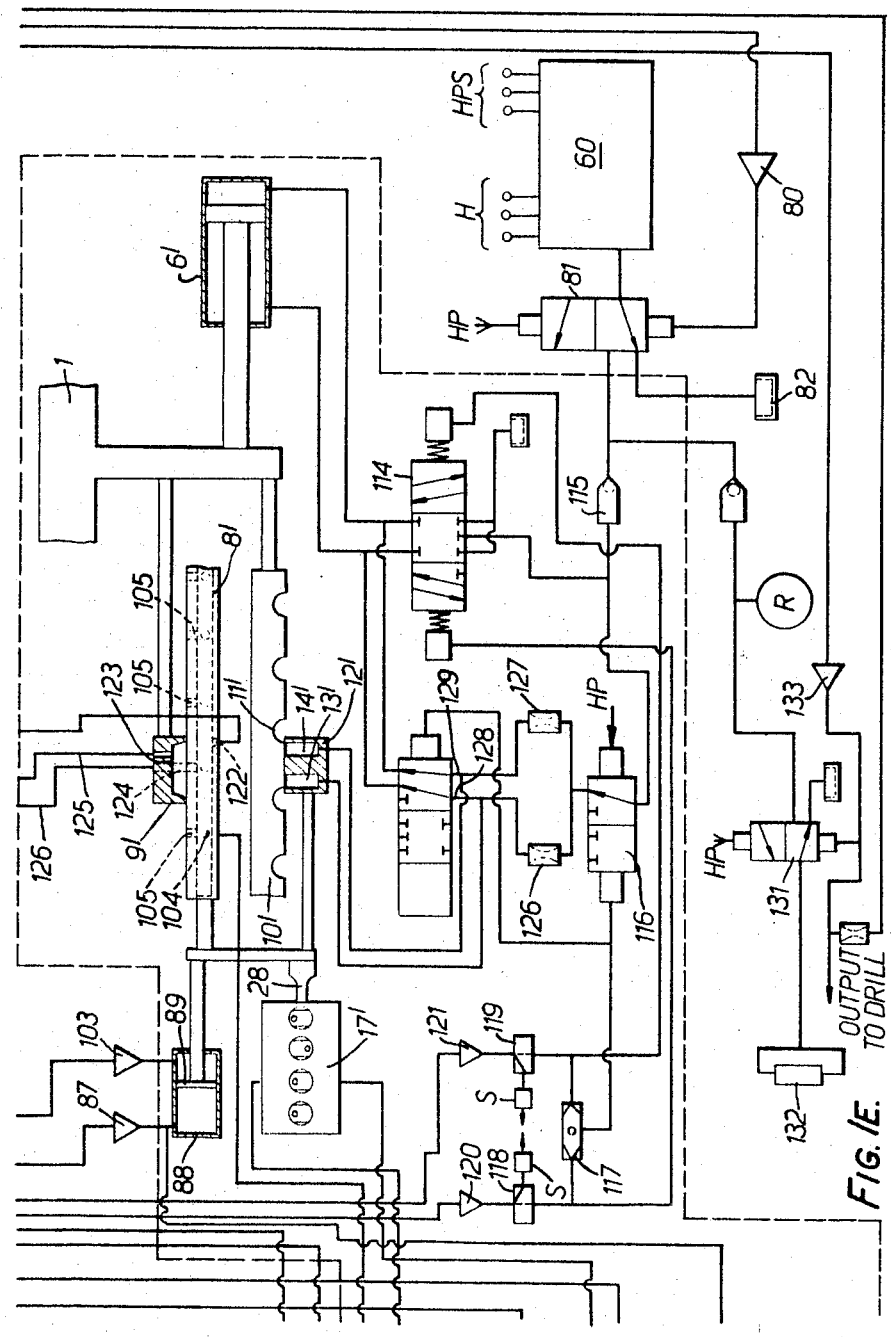

Filed Oct. 11, 1967    9 Sheets-Sheet 8

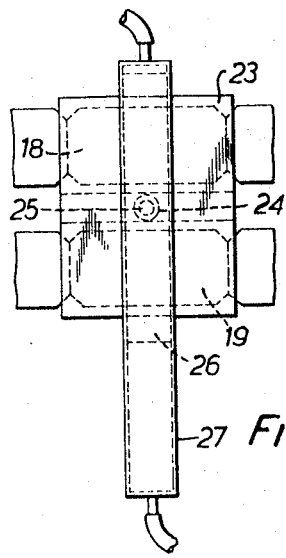
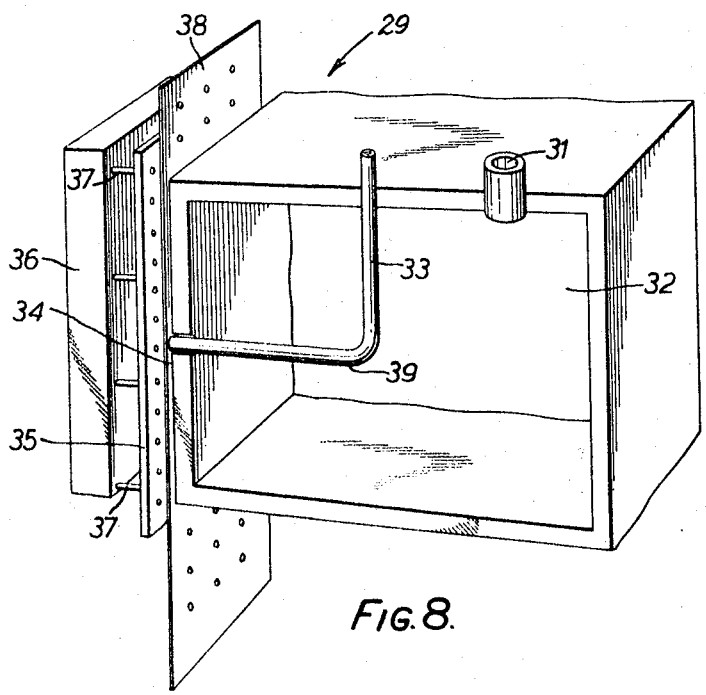

United States Patent Office 3,463,051
Patented Aug. 26, 1969

3,463,051
POSITION CONTROL EQUIPMENT
Richard F. Jones and Arnold V. Matthison, Ilford, England, assignors to The Plessey Company Limited, Ilford, England, a British company
Filed Oct. 11, 1967, Ser. No. 675,751
Int. Cl. F15b 21/02; F01b 21/00
U.S. Cl. 91—36                                  14 Claims

ABSTRACT OF THE DISCLOSURE

Position control equipment for a co-ordinate table comprising two movable structures and driving means therefor arranged for producing movement of said structures in parallel planes and in mutually perpendicular directions, in which each of the movable structures has associated with it coarse and fine position control devices, the coarse position control device being arranged to permit operation of said driving means initially during driving movement of each of said structures to the required position and operable upon the structure reaching the vicinity of said position to render the fine position control device effective for controlling the driving means, said fine position control device comprising co-operating relatively movable contoured reaction and fluid jet structures in close proximity with each other, said jet structure having a plurality of orifices therein through which fluid is supplied under pressure so that the difference in pressure of the fluid in said orifices resulting from their being asymmetrically orientated with respect to one contoured portion of the reaction structure, which contoured portions correspond to position increments of said movable structure, is utilised to produce relative movement between the reaction and jet structures thereby to effect accurate positioning of said movable structure to the desired position thereof.

---

This invention relates to position control equipment but relates especially but not exclusively to position control equipment of co-ordinate tables for the accurate positioning of machine tools for example.

The invention is especially directed to the provision of a co-ordinate table point to point position control equipment which is simple and relatively inexpensive to provide and which is extremely robust and reliable in operation while providing accurate positioning of the table.

According to one aspect of the present invention there is provided position control equipment for controlling the position of a movable structure in point to point movements of the table comprising preferably fluid operated driving means for driving the movable structure in a desired direction, coarse position control means arranged to permit operation of said driving means initially during the driving movement of said structure to a required position and operable upon said structure reaching the vicinity of said position to render fine position control means effective for controlling said driving means, said fine position control means comprising co-operating relatively movable contoured reaction and fluid jet structures in close proximity, said jet structure having a plurality of orifices therein through which fluid is supplied under pressure so that the difference in pressure of the fluid in said orifices resulting from their not being symmetrically orientated with respect to one contoured portion of the reaction structure, which contoured portions correspond to position increments of said movable structure, is utilised to produce relative movement between the reaction and jet structures thereby to effect accurate positioning of said movable structure to the desired position thereof.

The reaction structure preferably takes the form of an indented structure, with the jet orifices being arranged to be symmetrically disposed with respect to a particular shoulder between adjacent indentations when the desired position is reached.

The driving means may simply comprise a piston and cylinder which has fluid pipelines to supply hydraulic fluid to both sides of the piston. During coarse control movement of the movable structure fluid under pressure will be supplied to the appropriate side of the piston which is suitably coupled with the movable structure to produce movement of the latter towards the requisite position.

For the purpose of disconnecting this supply of pressure fluid to the piston, or otherwise terminating coarse control driving movement, a pneumatic detector shoe may be arranged to move along a perforated coarse position control bar in response to movement of the movable structure. These perforations located at intervals along the bar are arranged to have a pressurised air supply selectively connected to one perforation thereof in dependence upon the particular position to which the movable structure is required to be moved. More specifically, the pressurised air is applied through a selected one of the perforations during coarse control movement of the movable structure. When the detector shoe passes over the selected perforation the pressurised air is sensed through a pick-off pipe which communicates with a cavity on the underside of the shoe body. The picked-off air pressure is utilised for effecting the disconnection of the pressure fluid supply to the drive piston. At the same time fluid under pressure may be admitted to both sides of the pistons through pipelines including restrictors. This fluid may also be supplied to two orifices provided in a fixed block member constituting the aforesaid jet structure which is located in close proximity with a linear indented bar of the fine position control means. The orifices are spaced apart in the direction of the indentations along the bar by an amount corresponding to the length of one shoulder. The bar is coupled up to move with the movable structure so that at the termination of the coarse control drive of said structure the two orifices will be asymmetrically disposed in close proximity with a particular shoulder corresponding to the desired position of the movable structure. Consequently, when the fine position control means takes over there will be a fluid pressure difference between the two orifices and this pressure difference will be transmitted back to the piston which will accordingly take up a new position thereby moving the indented bar in order to reduce the pressure difference to zero by centralising the shoulder with respect to the two orifices of the jet structure. At this point the movable structure will be located at its desired position.

The shape of the orifices determines the movement characteristic of the indented bar and the movable structure. For example square orifices produce a very rapid slowing down characteristic of the movable structure whereas rectangular orifices elongated in the direction of movement of the indented bar provide more prolonged slowing down of the movable structure.

The position of the jet structure having the orifices therein may itself be varied in order to change the datum positions for the movable structure. This may be achieved by the use of a so-called slip gauge or fine measuring arrangement operated pneumatically say, so that position of the block can be varied by one thousandth of an inch increments, for example up to 1 inch.

It will be appreciated that the equipment described above for the position control of a movable structure in one direction could be repeated for providing position control of the movable structure in a second direction which may be perpendicular to the first direction. Thus it becomes apparent that the present invention lends itself extremely well to the position control of a co-ordinate table.

Thus according to another aspect of the present invention there is provided a co-ordinate table comprising two movable structures for movement in parallel planes an in mutually perpendicular directions in which movement of the table from one position to another is provided by fluid operated driving means and the table position control is provided by fluid-operated detector and control devices.

In applying the invention to a co-ordinate table the movable table is preferably mounted on so-called air bearings so that the table is supported by means of an air cushion so reducing friction to a very low level.

The present invention affords a simple and relatively inexpensive position control system and by using pressure fluid (e.g. hydraulic fluid and air) the equipment is particularly suitable for use in machine shops where supplies of hydraulic fluid and compressed air are readily available.

By way of example one embodiment of the invention will now be described with reference to the accompanying drawings in which.

Figure 1B:
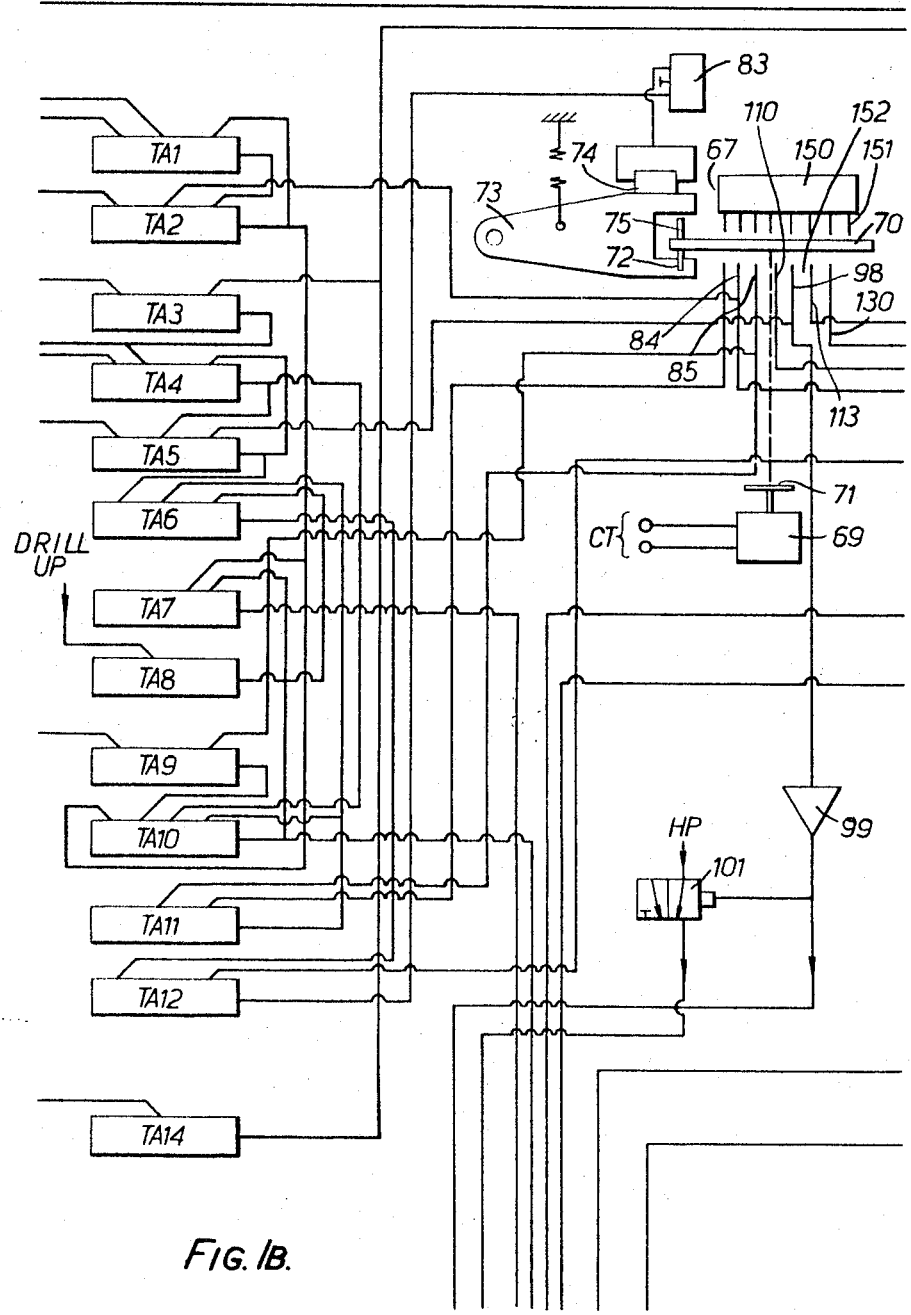
FIG. 1 is a sheet assembly diagram illustrating the manner in which FIGS. 1A, 1B, 1C, 1D, and 1E, which together form a schematic diagram of a fluid control co-ordinate table with its associated fluid hydraulic and electromechanical controls, should be assembled.
Figure 1C:
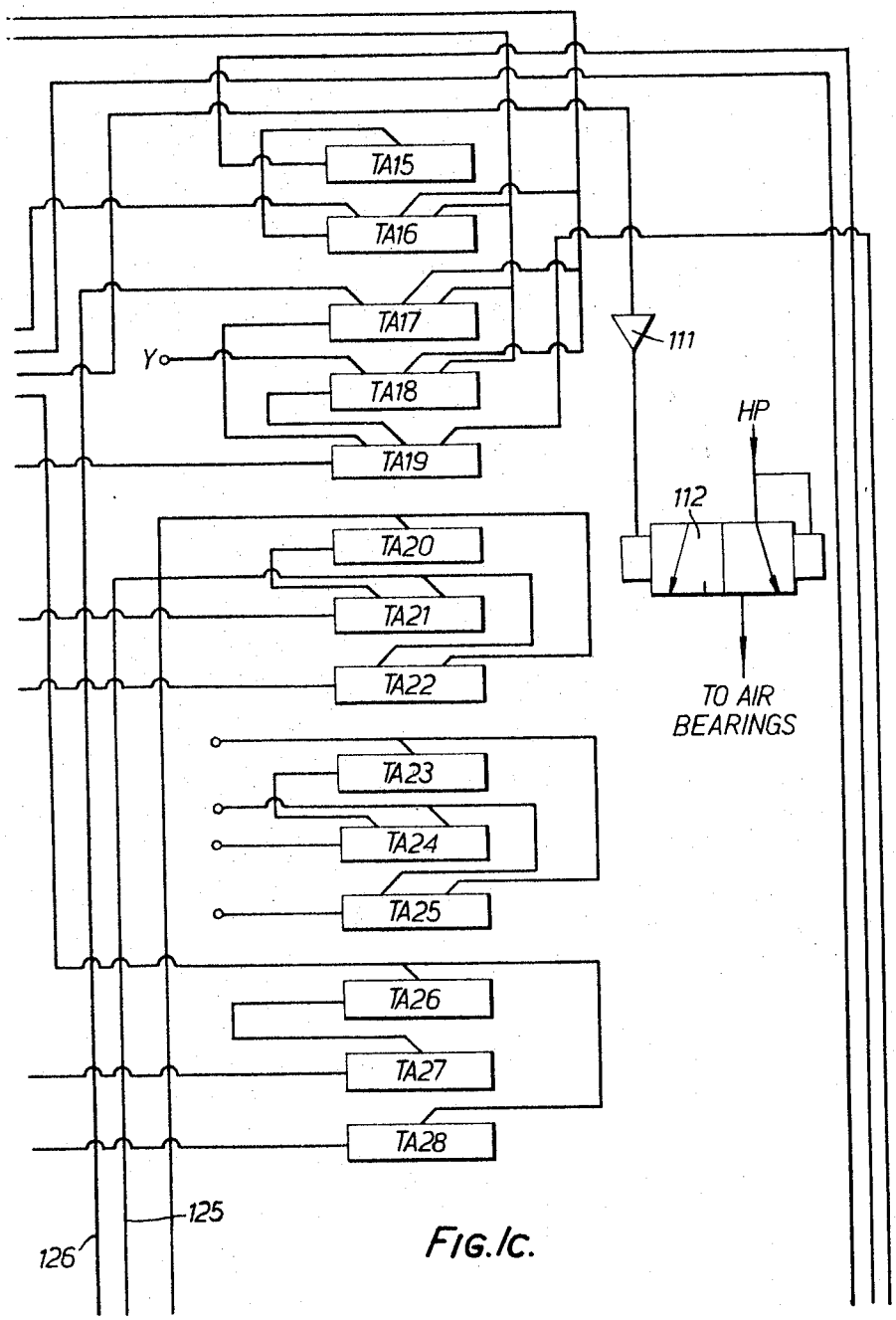
Figure 2:
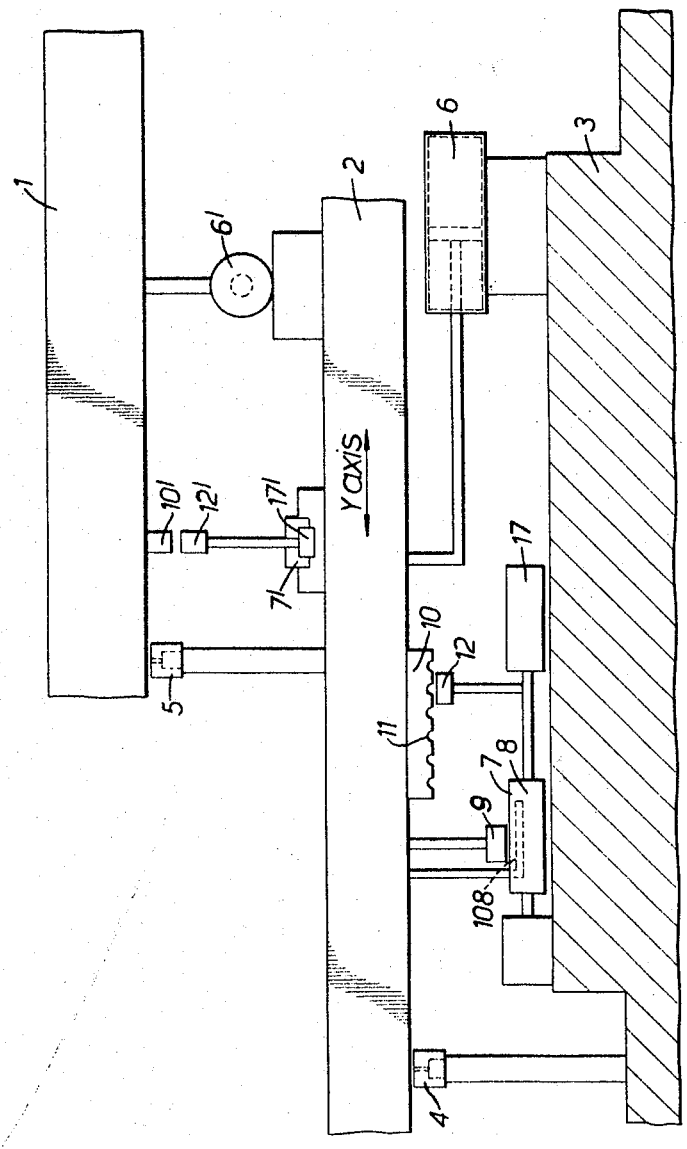
FIGURE 2 is a diagram of the co-ordinate table of FIGURE 1 showing the associated actuating means and position control equipment.
Figure 3:
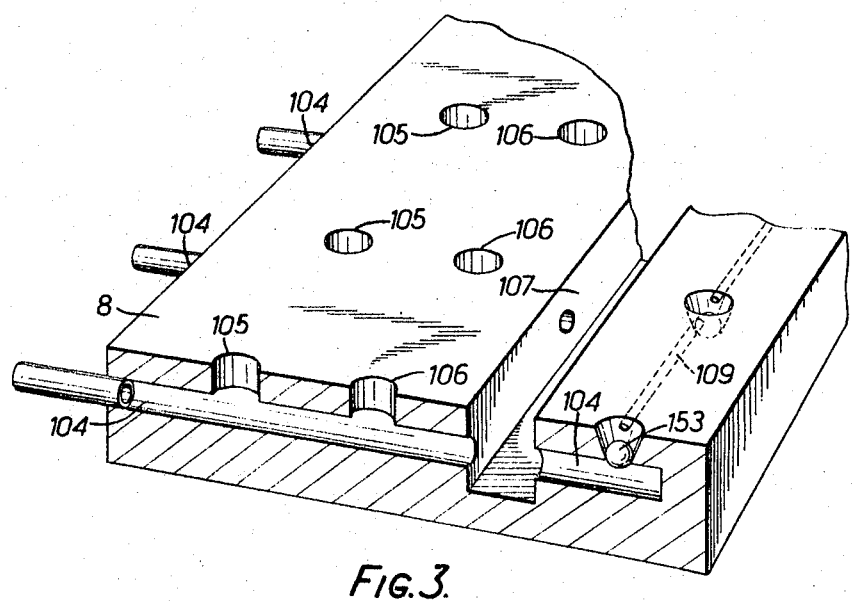
Figure 4:
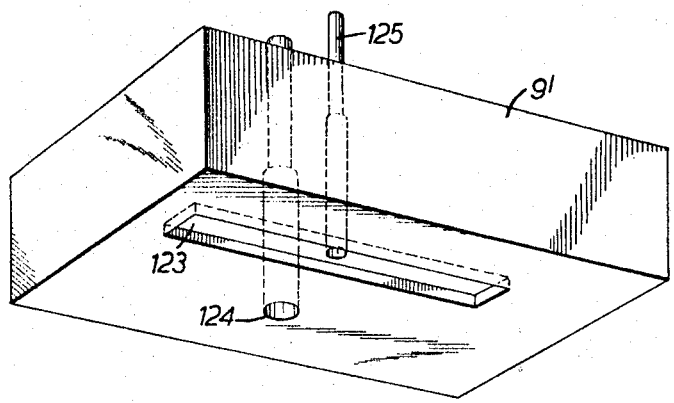
Figure 5:
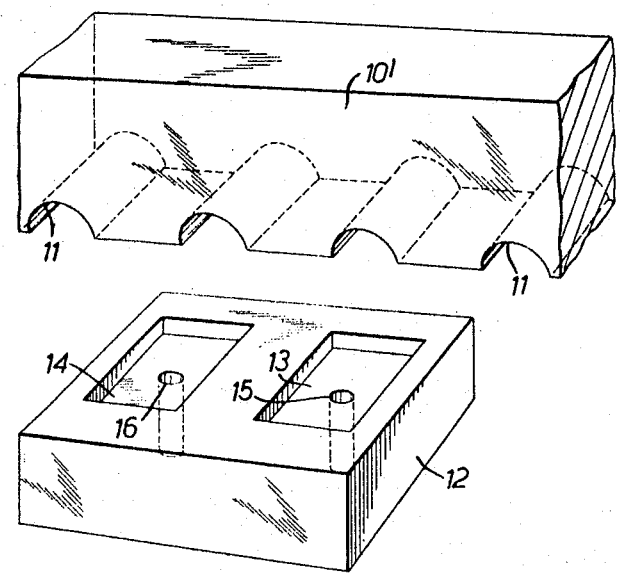
Figure 6:
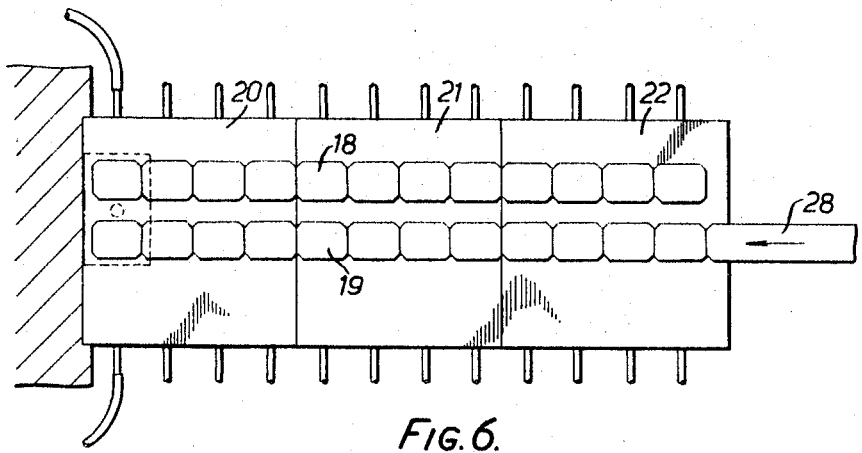

FIGURES 3 and 4 together show fragmentarily a coarse position control device of the position control equipment of FIGURES 1 and 2;

FIGURE 5 shows part of a fine position control device of the position control equipment of FIGURES 1 and 2;

FIGURES 6 and 7 show diagrammatic views of fine position or datum adjusting means for the table; and FIGURE 8 is a diagram which illustrates the mode of operation of a tape reader of the co-ordinate table control system.

Referring firstly to FIGURES 1 and 2 of the drawing and more especially to FIGURE 2, the co-ordinate table comprises a horizontal table structure 1 which is adapted to carry the workpiece to be drilled for example by means of a drill (not shown) arranged to be lowered to perform a drilling function on the workpiece when the table and thus the workpiece carried thereby takes up a pre-programmed position relatively to the drill.

For the purpose of positioning the table structure 1 the latter is slidably mounted on structure 2 (FIGURE 2) which is itself slidably mounted on a fixed base structure 3 the directions of sliding movement of the structure 1 and 2 being mutually perpendicular and providing horizontal movement of the table structure 1 along X and Y co-ordinates relative to the fixed base structure 3. As just mentioned the two structures 1 and 2 are slidably connected to each other and the structure 2 is slidably connected to the base structure 3 but to reduce friction during movement air bearings, such as those represented diagrammatically at 4 and 5 are provided. For moving the structure 2 along the Y axis a hydraulic piston and cylinder arrangement 6 will be operated in the appropriate sense and in order to control the movement of the structure 2 to the requisite Y axis position in accordance with punched tape information to be discussed later fluidic control devices are provided. Referring now to FIGURE 2 only one such control device for controlling coarse movement of the structure 2 is indicated at 7 and consists of a bar 8 which has rows of holes therein to which air is selectively fed in accordance with the desired Y position of the structures 1 and 2. In association with the perforated bar 8 is a detector shoe 9 of cup shape which is fixedly secured to the structure 2 and which detects air issuing from a hole in the bar 8 as the structure 2 is being moved by the hydraulic piston and cylinder arrangement 6 when the shoe is positioned over the hole. In response to such detection a fast drive operation of the structure 2 will be terminated and control transferred to a fine position control device. Briefly, this latter device consists of an indented pitch bar 10 having semi-cylindrical indentations or cut-outs 11 at pre-arranged regular intervals (e.g. inch intervals) along its length. The bar 10 has associated with it a jet block 12 coupled to the base structure 3. The jet block 12, as can best be seen in FIGURE 5, has in one face thereof adjacent the pitch bar 10 two rectangular recesses 13 and 14 with which holes 15 and 16 communicate. In operation of the device hydraulic fluid will be fed to both of the holes 15 and 16 and any pressure differential between the pressures in the holes due to such fluid escaping at different rates from between the recesses 13 and 14 and opposed surfaces of the pitch bar 10 will be a measure of the asymmetrical positioning of the jet block with respect to a shoulder positioned between two cut-outs 11. This pressure differential is utilised to effect slow drive operation of the hydraulic piston and cylinder arrangement 6 to effect fine positioning of the structure 2 at a required position along the Y axis. The piston of arrangement 6 will no longer be actuated when the pressure differential is zero thereby indicating that the jet block is symmetrically positioned with respect to to the shoulder between cut-outs 11. It will be appreciated that horizontal movement of the structure 2 along the Y axis similarly moves the structure 1. Movement of the structure 1 along the X axis may be achieved by a further hydraulic piston and cylinder arrangement together with coarse and fine position control devices as just above described for movement control of the structures 1 and 2 along the Y axis. The corresponding devices and parts appertaining to structure 1 are appropriately sufficient but bear the same numerical designations.

In addition to the coarse and fine position control devices each of the movable structures 1 and 2 has associated with it a fine measuring unit 17 or 17' as shown in greater detail in FIGURES 6 and 7. These units by the adjustment thereof enable fine positional adjustments to be made to selectable Y positions of the structure 2 relative to the fixed head structure 3 in the case of unit 17, and to selectable X positions of the table structure 1 in the case of the fine measuring unit 17'. As can be seen from FIGURES 6 and 7 these units consists of two rows 18 and 19 of accurately dimensioned cylinders arranged in three blocks 20, 21 and 22 of eight cylinders each. The cylinders in one row of cylinders differ in length from corresponding cylinders in the other row. It is arranged that the blocks 20, 21 and 22 appertain to variations in selectable positions by thousandths, hundredths and tenths of an inch, respectively. Referring now to FIGURE 7 specifically each pair of dimension cylinders arranged one above the other, which differ in length from each other by 1, 2, 4 or 8 thousandths, hundredths or tenths of an inch according to which block and in which position in the block the cylinders are situated, are coupled together by a yoke member 23 which has transverse semi-cylindrical cut-away parts for slidably accommodating the cylinders. This yoke has an aperture at 24 which is engaged by pin or stud 25 secured to an air piston 26 which is accommodated in air cylinder 27. If pressure air is admitted to the port at the top end of the cylinder 27 the piston will move to the bottom of cylinder 27 carrying the yoke 23 and two dimension cylinders accommodated therein with it. Thus it will be seen that if the pressure on the row 19 of lower cylinders is released by releasing pressure on a stack bar 28 when the air pistons 26 associated with the twelve pairs of cylinders may be selectively operated by applying air jets to the pistons to move the top dimension cylinders down into line with the stacking bar 28 thereby varying the total length of the cylinders aligned with the stacking bar 28. After positional adjustment of the cylinders has taken place reapplication of the pressure to the stacking bar 28 will cause the bar to move to the left so that the bar takes up a linear position determined by the aggregate dimensions of cylinders in line with it. Thus it will be seen that in effect the datum positions of the structures 1 and 2 can be varied by up to one thousandth of an inch by these units.

Having described briefly the driving means and positional control arrangement for the table the entire system will now be described with reference to all the drawings but especially with reference to FIGURE 1.

The co-ordinate table is arranged to perform programmed movements which are impressed on a punched tape. To produce each movement the control system executes one complete cycle of operations culminating in a control signal being given to an associated drill contral at the completion of the cycle thereby signifying that the table and thus the workpiece carried by it is in the requisite X, Y position for drilling to take place. Thus the drill can be controlled automatically during a sequence of drilling operation of the workpiece without the intervention of an operator.

The punched tape which carries the coded programme is fed to a tape reader 29 by a motor-driven tape sprocket drive. The principle of operation of the tape reader is illustrated in FIGURE 8. Pressure air is fed through a pipe 31 to a chamber 32 through which extends a multiplicity of pipes, only one of which is shown at 33 for the sake of clarity, which terminate at openings in a reading face plate 34 of the chamber. Each of the openings in the reading plate has aligned with it an opening in a perforated clamping plate 35 which is spaced away from a main clamping and support structure 36 by spacing pillars 37. Punched tape 38 is arranged to pass between the reading plate 34 and the perforated clamping plate 35 and the arrangement is such that with the tape clamped between the two clamping plates air which passes into the pipes, such as the pipe 33, through a small orifice such as orifice 39 and this air will either pass out through the aligned perforations of the clamping plate 35 and the reading plate 34 if a perforation in the tape coincides therewith or the pressure will build up in the pipes if no such tape perforation is present. Consequently the pressure outputs from the pipes correspond to the encoded punched tape data.

Information applied to the tape will be arranged in blocks each block including X axis position and Y axis position information as well as other data such as "cycle hold" and "block delete" data to mention just two instructions which could be applied to the tape.

The binary data concerning the X and Y axis positions of the table derived from the tape reader 29 is fed in part to fluid-controlled decoder mechanisms for converting the binary data to decimal data through high gain fluid relays and part to the time measuring units through further high gain relay. It will be understood that the decoder mechanisms appertain to the respective X and Y driving control equipments relating to structures 2 and 1 respectively. Referring specifically to the outputs from the tape reader 29 relating to the X axis position of the table the number of inches in tens and units of such position is applied (FIGURE 1D) in binary code to a pipe 40 (tens) and four other pipes 41 to 44 (units). Since a single tens pipe 40 is employed in the present example it will be appreciated that the X position number of whole inches cannot exceed nineteen. As far as the fractional content of the required X axis position is concerned it is indicated in binary form by the outputs from three sets of four output pipes only one pipe per set being shown at 45, 46, and 47. These sets of pipes correspond to tenths, hundredths and thousandths of an inch in the X axis position.

In the case of whole inch content of the X axis position the pipes 40 to 44 are each taken to the inputs of high gain relays, only one such relay being shown at 48 in respect of the pipe 40. As regards the operation of these high gain relays the presence or absence of an input (air pressure) signal will cause the sense of outputs (no pressure air or pressure air) from the relay to reverse. The outputs of these relays are taken to spaced apart plate structures, such as the structures 49 and 50. These structures have a perforated tape 51 attached to them and according to whether the plate structure 49 or the structure 50 has a pressure input applied to it from the relay 48 the tape 51 assumes alternative positions corresponding in effect to binary "1" and binary "0" positions. As will be seen from the drawing the tape 51 has a looped portion 52 between rollers 53 (free) and 54 (fixed) when the tape assumes one position. If, however, a pressure input is applied to the structure 50 then the tape 51 will be drawn to the right taking up loop portion 52 and forming a corresponding looped portion between the rollers 55 (fixed) and 56 (free). There will be a corresponding tape and two plate structures and rollers for each of the high gain relays, that is to say there will be five tapes in all, and these tapes including the tape 51 will be superimposed on each other as they pass between a clamping structure 57 which also serves as a pressure air manifold and a perforated binary to decimal reader 58 which provides a pressure output from one of its output pipes signifying the whole inch (tens and units) content of the required X axis position. The decoder appertaining to the structure 2 will likewise provide a pressure output corresponding to the whole inch content of the requisite Y axis position.

The three sets of four pipes 45 to 47 correspond to thousandths, hundredths and tenths of an inch and are taken to three sets of four high gain relays and relay of one set of four being indicated at 100, the outputs of which are fed to opposite sides of pistons in the fine measuring unit 17'. As already mentioned this fine measuring unit comprises three main sections corresponding to thousandths, hundredths and tenths of an inch respectively.

To set the whole system into operation an electrical isolator 59 is switched on to supply electrical power via terminals H to heaters for the hydraulic fluid in the hydraulic power supply 60. Power is also supplied to a transformer 61 and starter 62. The air supply for the system is then switched on by the operation of an air cock 63. The air pressure from the supply which is indicated on pressure dial 64 actuates a pneumatic piston 65 which in turn operates a microswitch 66. This microswitch 66 in operating completes a circuit for supplying power to the driving motors of the tape reader 29 and pneumatic output cycle timer 67. These motors are indicated at 68 and 69, respectively, and are supplied with power via terminals TM and CT respectively. The tape reader motor 68 is stalled at this juncture since it is latched against movement whereas the cycle timer 67 which consists of a circumferentially slotted disc 70 driven through a slipping clutch 71 starts to drive the disc until a pin such as that shown at 72 engages with a pivoted latching member 73. It may here be explained that the disc 70 has circumferential slots of predetermined lengths and of different radii from the centre of the disc and rotation of the disc through predetermined angles is controlled by the operation of the latch in combination with stop pins on the disc. As will be apparent from the drawing the latch may be pivoted downwards by operating an air piston 74 so that a pin 75 can then engage the latch as the disc 70 rotates. As mentioned above the motor 69 drives the disc 70 until the latch arrests the disc. The disc 70 is interposed between a cylindrical air manifold 150 with output pipes 151 and pick up pipes generally designated 152 which are supplied with pressure air selectively according to the positions of the slots in the disc 70 as the latter rotates.

A "RESET" button 76 is then depressed which switches high-pressure air (indicated at point HP) to a piston 77 for actuating a microswitch 78. This microswitch 78 operates and the starter 62 operates to provide electrical power for the operation of the hydraulic pump of the hydraulic power supply 60 via terminals HPS. At this juncture turbulence fluidic amplifiers are brought into play. These turbulence amplifiers which are prefixed TA are arranged to provide an air pressure output in the absence of any pressure input and to terminate such output when any pressure input is applied thereto. Referring now to the effect of operating the reset button 76, air pressure is applied to TA1 which together with TA2 form a bistable switching arrangement. The bistable arrangement switches and accordingly feeds output to TA7 which consequentially applies an output to a high gain relay 79 which switches its pressure output to TA16, TA17, and TA18. By so doing the clamping structure 36 of the tape reader 29 is released in readiness for advancement (or insertion) of the tape 38. Input to TA16 causes it to switch OFF the switch on TA15, the output of which is fed through an amplifier 80 to operate a dump valve 81 which diverts fluid from hydraulic power supply 60 to reservoir 82. TA17 switches OFF as does TA18 and causes TA19 to respond to provide a pressure input to TA12. TA12 accordingly responds to operate high gain relay 83 the output from which operates the piston 74 to pivot the latch 73 downward so allowing the disc 70 to rotate by the dis-engagement of the pin 72 from the latch 73. The timer disc 70 now returns to its zero or start position at which a further disc stop engages with a latch 73 to arrest the disc.

The tape reader 29 is now loaded with punched tape, if the tape has not already been inserted, and a "START" button 135 is then pressed. The button 135 extends air pressure to TA2 and the bistable switching arrangement TA1 and TA2 switches over. The air pressure is also fed to TA5 which forms a bistable switching arrangement with TA4. The output from TA5 to TA6 switches off and if the two other inputs to TA6 one of such inputs coming from the disc 70 of the cycle timer via TA11, are switched OFF then TA6 will provide an output which serves to switch off TA12 and thereby produce actuation of the pivoted latch 73 through response of relay 83 in order to allow the cycle timer disc 70 to rotate from its zero or start position to start a cycle of operations. The cycle timer disc rotates until air pressure signals passing through slots in the disc are sensed by pickup pipes of the pipes 152. These signals sensed first by the pipes 84 and 85 are for effecting an unstacking operation of the fine measuring units, only one of which appertaining to the X drive is shown at 17' in readiness for a setting operation thereof and for tape reading purposes.

As regards the unstacking signal this is applied to TA26 and TA28 which are switched OFF while TA27 is switched on. The output signal from TA27 is fed via an amplifier 87 to the left-hand end of a stacking cylinder 88. The pressure accordingly exerted on stacking piston 89 releases the pressure on the effective in-line dimensions cylinders of the fine measuring unit 17' by the stacking bar 28. This enables the dimension cylinders to be moved as desired for the setting of the unit. The amplified output from amplifier 87 is also utilised to release the clamp 90 of the decoder unit.

The tape read signal derived picked up by pipe 85 is fed to TA11 which is switched OFF and TA10 is accordingly switched ON (all inputs off) and the output therefrom is fed to high gain relay 91 the output from which actuates piston 92 which in turn moves a pivoted spring biased actuator 93 to the left until it pushes spring mounted stop 94 clear of the edge of an abutment 95 whereupon sprocket 96 coupled to stalled motor 68 advances the tape by a distance corresponding to an 180° rotation of the sprocket which corresponds to one block of punched data or information, at which point the other stop 97 engages the abutment 95.

The output from TA10 also feeds TA7 which is switched off and relay 79 is operated to effect clamping of the advanced tape by the structure 36. By this clamping action pressure air will be derived from output pipes from the tape reader as fully described with reference to FIGURE 8.

As the cycle timer disc 70 rotates the next step is for air to be picked up by pipe 98 through the disc 70. The air signal picked up is amplified by amplifier 99 and the output from the amplifier is fed in common to all of the twelve high gain relays, one only of which is shown at 100, appertaining to the twelve output pipes from the tape reader chamber 32, arranged in three sets of four 45, 46 and 47. Pressure outputs from these high gain relays will be applied to one or other side of the pistons of the fine measuring unit 17' in accordance with the pattern of inputs to the relays derived from the tape reader regarding the tenths, hundredths, and thousandths of an inch content of the required X axis position. The dimension cylinders will accordingly be moved to provide the appropriate total cylinder length in line with the stacking bar 28.

The amplified output from amplifier 99 also operates a valve 101 which applies high pressure air in common to the high gain relays one of which is shown at 48, associated with the decoder. The outputs of these relays will be dependent upon the pattern of inputs to the relays corresponding to the whole inch (tens and units) content of the X position and derived from the tape reader 29. As previously mentioned each of the five high gain relays, including relay 48, has associated with it a pair of spaced tape supporting plate structures and associated rollers, such as the structures 49 and 50 and rollers 53 to 56 appertaining to the relay 48, as well as a punched tape, such as tape 51. The five tapes, including tape 51, extend in parallel superposed relationship between the clamping structure 57 and the structure 58. Thus according to the pattern of input signals applied to the five high gain relays so the tape will be moved to the left or right by the looping of the tape at the appropriate end thereof. The perforations in the respective tape co-operate positionally with one another in order to provide one coincident perforation in the five tapes which coincidence corresponds to the decimal equivalent of the binary input to the high gain relays from the tape reader. Consequently, when the clamp structure 57 is urged into clamping engagement with the tapes by the actuation of the piston 90 consequent upon the termination of the pressure input to pipe 98 of the cycle timer, one of the output pipes, such as the pipe 102 will have air pressure applied to it through the coincident tape perforations from the structure 57. Also when the input to the pipe 98 is removed the conditions of TA27 and TA28 reverse so that pressure air is applied to the right-hand side of stacking piston 89 of the stacking cylinder through an amplifier 103. This causes the stacking bar 28 to make pressure engagement with the dimension cylinders in line with it after the adjustment of the fine measuring unit in accordance with the fractional output from the tape reader 29.

Let it be assumed for the purposes of description that the air pressure output from the decoder appears in pipe 102. As can be seen the air pressure in this pipe is applied to one of a number of input openings 104 in the coarse measuring bar 8. These openings which can best be seen in FIGURE 3 are in the present example spaced at one inch intervals along the structure 8 and each has communicating with it a pair of holes 105 and 106. Thus air will be admitted from a particular pair of holes 105 and 106 according to the particular opening 104 receiving the air pressure input from the decoder. These holes 105 and 106 are arranged to be scanned by means of the detector shoe 9' which will be described more fully with respect to FIGURE 4 of the accompanying drawings. The openings 104 are interrupted by a transversely extending channel 107 which accommodates a blade shown at 108 in FIGURE 2. This blade is shown attached to the structure 2 (Y axis structure) but a corresponding blade will be attached to the structure 1 (X axis structure) which is associated with the corresponding coarse measuring bar carried by the structure 2. As will be appreciated from FIGURE 3 the blade as it moves along the channel 107 will interrupt the flow of pressure air in a selected opening 104 across the channel 107. This air flow when not interrupted acts on a ball 153 of a ball valve to lift the ball away from its seating and thereby admit pressure air to an elongate gallery or chamber 109 extending along the length of the bar 8 and commoned to ball valve associated with the other openings 104. Consequently, it will be appreciated that if a pick-off pipe 122 (FIGURE 1) is positioned midway along the gallery to detect air pressure in the gallery and the blade 108 is approximately one half the length of the bar 8, then the absence of air in the gallery will signify to the driving control means to be described later in detail that the blade already interrupts the air flow through a particular opening 104, and thus the table needs to be driven in a certain direction in order to reach the requisite position on the X axis, whereas the presence of air in the gallery signifies that the table requires to be driven in the opposite direction in order to reach the requisite X axis position. It will be appreciated that the operation for the Y axis movement will be similar.

Before driving movement of the table commences however the cycle timer in rotating causes pressure air to be applied to the pipe 110. This air pressure is amplified by a fluidic amplifier 111, the output from which is fed to a valve 112 which operates to feed high pressure air to the air bearings for the two moving structures 1 and 2, which bearings are shown diagrammatically at 4 and 5 in FIGURE 2.

The hydraulic dump valve 1 is next closed by the operation of TA16 and the consequential switching on of TA15 in response to the application of pressure air to pipe 113 of the cycle timer. Hydraulic fluid is thus applied to the table driving means. At this juncture the cycle timer disc 70 is arrested by a stop of the disc engaging with the latch 73.

The hydraulic fluid is fed to a fast traverse valve 114 through a non-return valve 115, valve 116 to which fluid is also applied being in the operated "off" state since there is an output from shuttle valve 117. This shuttle valve affords an output when either of two quick release valves 118 and 119 fitted with silencers has an input applied to it, amplified by amplifier 120 or 121 as the case may be, and derived from TA21 or TA22 as appropriate. The particular direction of travel of the structure 1 along the X axis to the requisite position is determined by the direction of actuation of the fast traverse valve 114 which in turn is dependent upon which of the amplifiers TA21 and TA22 is providing an output. In this connection it may be mentioned that TA20 is controlled by pressure air picked up by pipe 122 (FIGURE 1) from the gallery 109 (FIGURE 3) of the coarse measuring bar 8. As previously mentioned pressure air in the gallery, or the absence of such pressure air, signifies that the blade accommodated in the channel 107 of the bar 8 is in a particular positional relationship with respect to the particular opening 104 in the bar 8 to which air pressure is applied and thus indicates in which direction the structure 1 has to be moved in order for the detector shoe 9 (FIGURE 2) to detect pressure air issuing from the holes 105 and 106 of the bar 8 which communicate with the pressurised opening 104. Assuming however for the purposes of description that the pressure air is present in the gallery of the bar 8, thereby indicating that the blade 108 has not interrupted the air flow in the particular opening 104 which is pressurised then the input to TA20 will turn off the output of that device which will cause TA21 to turn on, assuming that the detector shoe 9' is not already in the detecting position. TA22 is also turned off by the air pressure in tube 122 extending from the gallery. The output from TA21 after amplification is fed to the left-hand side of the valve 114 to actuate this valve to the right as viewed in the drawing. This has the effect of supplying hydraulic fluid to the right-hand end of the hydraulic cylinder arrangement 6' so that the structure 1 will be moved to the left as viewed in the drawing and the blade moving in the channel 107 of bar 8 will accordingly move towards the particular opening 104 to which air pressure is applied from the decoder.

At this point it is convenient to refer to FIGURE 4 of the drawings which shows a diagrammatic perspective view of the detector shoe 9'. The undersurface thereof which co-operates with the face of the bar 8 having openings 105 and 106 therein, has formed therein an elongate rectangular recess 123 and a circular opening 124. The recess 123 has a pick-off pipe communicating therewith which is taken to one of the inputs of TA21 and TA22 while the hole 124 has a pick-off pipe 126 which extends to an input of TA17.

During movement of the detector shoe 9' along the bar 8' the recess 123 passes directly over holes 106 while the hole 124 passes directly over the holes 105. Reverting now to the fast traverse movement of the table structure 1, when the structure 1 approaches the requisite X position the shoe 9' passes over the pressurised holes 105 and 106, as a consequence of which pressure air is fed firstly to the recess 123 through opening 106. This pressure air is picked off by pipe 125 and applied to TA21 which accordingly switches off and thereby allows the fast traverse valve 114 to be restored under the action of its biasing spring to the "off" condition. TA22 is also in the switched off condition as a consequence of which there is no output from the shuttle valve 117. The result of this is to allow the slow traverse valve 116 to assume the "on" condition illustrated. Under these conditions hydraulic fluid is applied via restrictors 126 and 127 to the recesses 13', 14' of the jet block 12' which co-operates with the pitch bar 10' as has been fully described with reference to FIGURE 5. At the point where the jet block fine positioning device comes into operation the block recesses are asymmetrically disposed with respect to the opposed shoulder between two adjacent recesses 11' in the bar 10. Consequently there will be produced a differential pressure between the fluid pressures in the pipes 128 and 129 and thus different pressures act on the piston of the hydraulic piston and cylinder arrangement 6' to move the structure 1 slowly towards its final X axis position. When such final position is reached the hole 124 in the detector shoe 9 will be located directly over the pressurised opening 105 in the bar 8 and the pressure air will be picked off by the tube or pipe 129 which will cause TA17 to be switched off.

It will be seen from a consideration of the drawing that TA18 has an input from a pipe in the Y axis apparatus corresponding to pick-off pipe 126 of the X axis apparatus shown in FIGURE 1. Thus when the structure 1 has reached the X and Y axis positions outputs will be received at the input of TA17 and TA18. Both of these will switch off and cause TA19 to switch on through TA12 so that the cycle timer latch 73 is re-operated to allow the disc 70 to continue rotating. The disc 70 is now rotated for a short predetermined period which is calculated to allow the table to take up its final exact position. This allows for the fact that when the hole 124 picks up air from the pressurised opening 105 the holes 124 and 125 are not fully aligned with each other. At this juncture the cycle timer disc 70 removes pressure air from the pipe 110 to switch off the air supply to the air bearings 4 and 5 (FIGURE 2) and air is applied to pipe 130 to operate a table locking control valve 131 against the biasing pressure air applied thereto and thereby actuate table clamps, one only of which is shown at 132, but which will be associated with both of the structures 1 and 2 to effect locking of the entire table relative to the fixed base structure 3 (FIGURE 2). The input to the valve 131 which is amplified by an amplifier 133 may also be fed to the drill associated with the co-ordinate table to cause the drill to commence a drilling operation if the punch tape programme requires this. The disc 70 cuts off pressure air to the pipe 113 which causes switching of the bistable arrangement TA15 and TA16 and consequential removal of the output from TA15 allows the dump valve 81 to be restored to the fluid dumping condition as depicted in FIGURE 1E. Finally, the disc 70 stops such as in the zero position of the disc by the engagement of a disc stop with the latch 73 of the cycle timer.

After the workpiece carried by the locked table has been drilled and the drill is withdrawn to the retracted position a "DRILL UP" signal is applied to TA8 which accordingly switches off. TA6 switches on assuming that all the other inputs to TA6 are off. The cycle of operations as already described then commences again to move the table and workpiece to the next position ready for drilling.

A "CYCLE HOLD" switch 134 is provided which may be operated during a cycle of the cycle timer so that at the completion of the cycle the next cycle will be held up. This is achieved by arranging that TA4 and TA5 are so operated as to prevent TA6 from switching on which would normally allow the next cycle to commence. Also the operation of the cycle hold switch 134 allows a single cycle to be executed in response to the operation of the start button 135.

A "SKIP" button 136 is also provided and this allows the punched tape in the tape reader 29 to be moved forward by one block in order to miss or skip that block or programme cycle. This is achieved by applying pressure air to TA9 which switches off whereupon TA10 switches on to switch off TA7. When TA7 twitches off the high gain relay 79 responds and causes the tape reader clamp 90 to unclamp. TA10 in switching on produces response from high gain relay 91 which actuates the sprocket stop actuator 93 to allow the tape motor 68 to drive the sprocket through 180°. It may be mentioned however that the skip button is only effective when the cycle hold switch 134 is operated and disc 70 and timer is at its zero position. As has been mentioned previously FIGURE 1 of the drawings omits part of the apparatus which relates to the movement and position control of the structure 2 which effects movement of the co-ordinate table along the Y axis. In order to give more appreciation of the apparatus that would be required for the Y axis movement control the block shown on FIGURES 1D and 1E in dashed outline would be repeated in respect of the Y axis movement. As regards the turbulence amplifiers TA23 to TA25 these are provided in respect of the position control of the Y axis movement and will be connected correspondingly to the amplifiers TA20 to TA22.

From the foregoing description of an embodiment of the invention it will be appreciated that the coarse and fine position control arrangements enable a programmed sequence of movements of the co-ordinate table to be effected rapidly as for sequential drilling programmes for example. The pneumatic position control arrangements of the table are particularly reliable in operation and are particularly compatible with existing workshop supplies.

What we claim is:

1. Position control equipment for controlling the movement of a movable structure from one position thereof to aonther comprising driving means associated with the movable structure for driving the structure in a desired direction, coarse position control means arranged to permit operation of said driving means initially during a driving movement of said structure to a required position and operable upon said structure reaching the vicinity of said position to render fine position control means effective for controlling said driving means, said fine position control means comprising co-operating relatively movable contoured reaction and fluid jet structures in close proximity with each other, said jet structure having a plurality of orifices therein through which fluid is supplied under pressure so that the difference in pressure of the fluid in said orifices resulting from their being asymmetrically orientated with respect to one contoured portion of the reaction structure, which contoured portions correspond to position increments of said movable structure, is utilised to produce relative movement between the reaction and jet structures thereby to effect accurate positioning of said movable structure to the desired position thereof.

2. Position control equipment as claimed in claim 1 in which the driving means for the movable structure is fluid actuated.

3. Position control equipment as claimed in claim 1, in which the reaction structure takes the form of an indented structure with the jet orifices being arranged to be symmetrically disposed with respect to a particular shoulder between adjacent indentations when the desired position is reached.

4. Position control equipment as claimed in claim 3, in which the driving means comprises a hydraulic piston and cylinder arrangement with fluid pipelines to supply hydraulic fluid pressure to both sides of the piston.

5. Position control equipment as claimed in claim 1, in which the coarse position control means comprises a pneumatic detector shoe arranged to move along a perforated structure in response to movement of the movable structure, a selected perforation in said structure having pressure air applied to it in dependence upon a particular position to which the movable structure is required to be moved and in which the detection of the pressure air by said shoe as it moves into close proxmity relationship with it is utilised to render the fine position control means effective for controlling the driving means.

6. Position control equipment as claimed in claim 1, in which a datum position of the movable structure relatively to another structure with respect to which the movable structure moves is arranged to be finely adjusted by means of a fine measuring unit.

7. Position control equipment as claimed in claim 6, in which the fine measuring unit comprises a multiplicity of precisely dimensioned structures arranged to be selectively aligned to afford a total overall dimension which determines the datum position.

8. Position control equipment as claimed in claim 7, in which the selection of the dimension members is effected by the selective operation of air pistons.

9. Position control equipment as claimed in claim 5, in which the coarse position control means is controlled by the application of pressure fluid to a particular perforation in the measuring bar in dependence upon the output from a pneumatic decoder which decodes fluid data received from a pneumatic punch tape reader.

10. Position control equipment as claimed in claim 1, in which the equipment comprises a motor driven pneumatic output cycle timer which controls a sequence of operations in the movement of the movable structure from one position to another.

11. In operative association with a co-ordinate table comprising two movable structures arranged for movement in parallel planes and in mutually perpendicular directions, position control equipment as claimed in claim 1 which is provided in respect of each of the movable structures thereby to afford position control of the said table along its X, Y axis.

12. Position control equipment as claimed in claim 11, in which movement of the two movable structures is determined in dependence upon the binary coded outputs from a pneumatic tape reader which are applied to binary to decimal decoders in respect of the two movable structures the outputs from which are applied respectively to particular perforations of perforated bar structures of coarse position control means associated with the respective movable structures of the table.

13. Position control equipment as claimed in claim 11 in which the respective data positions of the movable structures relatively to each other or to a fixed bed structure are adjusted by fine increments in response to the operation of fine measuring units in dependence upon pneumatic outputs from the pneumatic tape reader.

14. Position control equipment as claimed in claim 11, in which a cycle timer is provided common to both movable structures which pneumatically controls the sequence of operations of the tape reader, pneumatic decoder, fine measuring units and driving means and table locking means.

References Cited

UNITED STATES PATENTS

| | | | |
|---|---|---|---|
| 2,331,337 | 10/1943 | Meyer | 91—37 XR |
| 2,995,899 | 8/1961 | Magor | 91—37 |
| 3,012,545 | 12/1961 | Goldmann | 91—36 |
| 3,198,084 | 8/1965 | Hague et al. | 91—37 |

EDGAR W. GEOGHEGAN, Primary Examiner

U.S. Cl. X.R.

60—57, 97; 91—37